(12) United States Patent
Sato et al.

(10) Patent No.: US 11,212,515 B2
(45) Date of Patent: Dec. 28, 2021

(54) INFORMATION PROCESSING DEVICE AND INFORMATION PROCESSING METHOD

(71) Applicant: SONY CORPORATION, Tokyo (JP)

(72) Inventors: Naoyuki Sato, Tokyo (JP); Hirotake Ichikawa, Tokyo (JP); Seiji Suzuki, Kanagawa (JP); Masato Shimakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/343,547

(22) PCT Filed: Oct. 27, 2017

(86) PCT No.: PCT/JP2017/038859
§ 371 (c)(1),
(2) Date: Apr. 19, 2019

(87) PCT Pub. No.: WO2018/092545
PCT Pub. Date: May 24, 2018

(65) Prior Publication Data
US 2019/0268587 A1   Aug. 29, 2019

(30) Foreign Application Priority Data
Nov. 21, 2016 (JP) .............................. JP2016-226210

(51) Int. Cl.
*H04N 13/351* (2018.01)
*H04N 13/15* (2018.01)
(Continued)

(52) U.S. Cl.
CPC ........... *H04N 13/351* (2018.05); *G06T 19/00* (2013.01); *H04N 7/18* (2013.01); *H04N 13/15* (2018.05); *H04N 2013/40* (2018.05)

(58) Field of Classification Search
CPC .. H04N 13/351; H04N 13/15; H04N 2013/40; H04N 5/247; H04N 7/18;
(Continued)

(56) References Cited

U.S. PATENT DOCUMENTS

| 2016/0189280 A1* | 6/2016 | York | G06Q 30/0635 |
| | | | 705/26.81 |
| 2017/0026680 A1 | 1/2017 | Sugio et al. | |
| 2017/0040002 A1* | 2/2017 | Basson | G06F 21/84 |
| 2017/0251361 A1* | 8/2017 | Chan | H04M 3/42042 |

(Continued)

FOREIGN PATENT DOCUMENTS

| CN | 106664393 A | 5/2017 |
| EP | 3133819 A1 | 2/2017 |

(Continued)

OTHER PUBLICATIONS

International Search Report and Written Opinion of PCT Application No. PCT/JP2017/038859, dated Jan. 23, 2018, 11 pages of ISRWO.

*Primary Examiner* — Xilin Guo
(74) *Attorney, Agent, or Firm* — Chip Law Group

(57) ABSTRACT

There is provided an information processing device and an information processing method, capable of appropriately restricting viewing of content based on a result of sensing a real space. The information processing device includes a viewing restricting unit configured to restrict, on the basis of a predetermined condition, viewing of a part of content corresponding to a partial space of a real space among content of a free viewpoint generated based on a sensing result for the real space.

17 Claims, 13 Drawing Sheets

(51) Int. Cl.
    *H04N 7/18*       (2006.01)
    *G06T 19/00*      (2011.01)
    *H04N 13/30*      (2018.01)

(58) Field of Classification Search
    CPC ......... H04N 21/2541; H04N 21/23439; H04N
              21/23418; G06T 19/00; G06T 19/003;
              G06T 1/0007; G06T 19/20; G06T 11/60;
              H04L 67/22; H04L 67/306; H04L 51/12;
              H04L 63/0428; H04L 63/102; H04L
              9/3234; H04L 63/107; H04L 63/1416;
              H04L 43/04; H04L 43/08; H04L 63/0407;
              G06F 21/16; G06F 21/552; G06F
              21/6245; G06F 16/90344; G06F 3/04842;
              G06Q 50/265; G06Q 20/3674; G06K
              9/6262; G06K 9/00671; G06K 2009/3291
    See application file for complete search history.

(56) References Cited

U.S. PATENT DOCUMENTS

| | | | |
|---|---|---|---|
| 2017/0278262 A1 | 9/2017 | Kawamoto et al. | |
| 2017/0289623 A1* | 10/2017 | Bailey | G06K 9/78 |
| 2017/0337352 A1* | 11/2017 | Williams | G06T 19/006 |
| 2019/0335290 A1* | 10/2019 | Laaksonen | H04S 7/304 |

FOREIGN PATENT DOCUMENTS

| | | |
|---|---|---|
| EP | 3177010 A1 | 6/2017 |
| JP | 2005-004487 A | 1/2005 |
| JP | 2005-252849 A | 9/2005 |
| JP | 2009-225398 A | 10/2009 |
| JP | 2013-106324 A | 5/2013 |
| JP | 2015-204512 A | 11/2015 |
| JP | 2016-122892 A | 7/2016 |
| WO | 2016/017245 A1 | 2/2016 |

* cited by examiner

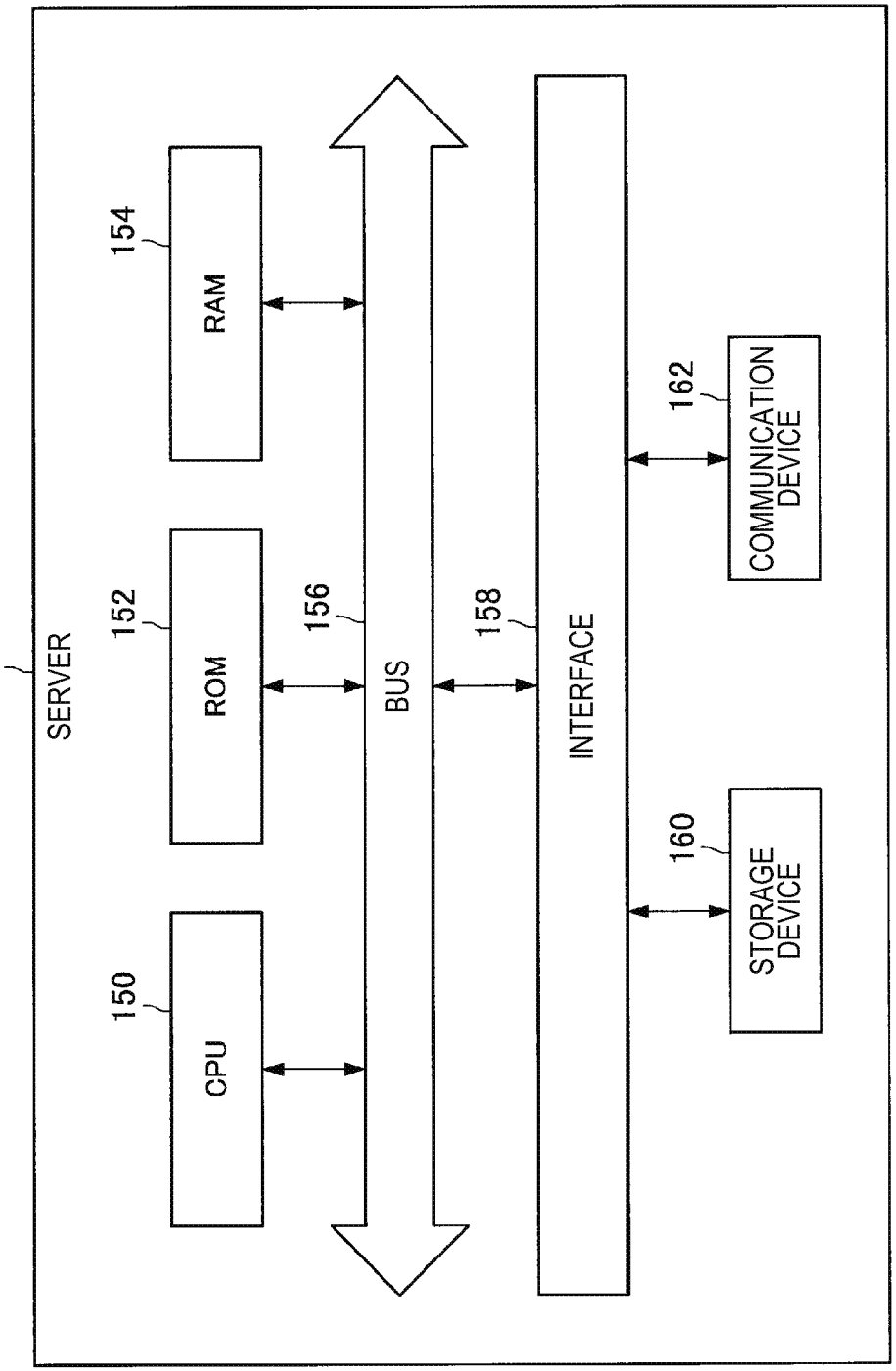

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/038859 filed on Oct. 27, 2017, which claims priority benefit of Japanese Patent Application No. JP 2016-226210 filed in the Japan Patent Office on Nov. 21, 2016. Each of the above-referenced applications is hereby incorporated herein by reference in its entirety.

TECHNICAL FIELD

The present disclosure relates to an information processing device, an information processing method, and a program.

BACKGROUND ART

In the past, various techniques for generating content on the basis of a result of sensing a real space, for example, for the purpose of generating highly realistic content have been proposed.

For example, Patent Literature 1 discloses a technique for generating an omnidirectional image on the basis of images captured by a plurality of cameras arranged so that their fields of view partially overlap each other.

CITATION LIST

Patent Literature

Patent Literature 1: JP 2005-4487A

DISCLOSURE OF INVENTION

Technical Problem

Incidentally, there are cases in which it is undesirable for the entire real space to be seen by, for example, an external user depending on the real space.

However, in the technique described in Patent Literature 1, the user can view all regions in the generated omnidirectional image in detail.

In this regard, the present disclosure proposes an information processing device, an information processing method, and a program which are novel and improved and capable of appropriately restricting viewing of content based on a result of sensing a real space.

Solution to Problem

According to the present disclosure, there is provided an information processing device, including: a viewing restricting unit configured to restrict, on the basis of a predetermined condition, viewing of a part of content corresponding to a partial space of a real space among content of a free viewpoint generated based on a sensing result for the real space.

Moreover, according to the present disclosure, there is provided an information processing method, including: restricting, by a processor, on the basis of a predetermined condition, viewing of a part of content corresponding to a partial space of a real space among content of a free viewpoint generated based on a sensing result for the real space.

Moreover, according to the present disclosure, there is provided a program causing a computer to function as: a viewing restricting unit configured to restrict, on the basis of a predetermined condition, viewing of a part of content corresponding to a partial space of a real space among content of a free viewpoint generated based on a sensing result for the real space.

Advantageous Effects of Invention

As described above, according to the present disclosure, it is possible to appropriately restrict viewing of content based on a result of sensing a real space. Further, the effect described here is not necessarily limiting, and any effect described in the present disclosure may be included.

BRIEF DESCRIPTION OF DRAWINGS

FIG. 13 is an explanatory diagram illustrating a hardware configuration example of a server 10 which is common to respective embodiments.

MODE(S) FOR CARRYING OUT THE INVENTION

Figure 1:
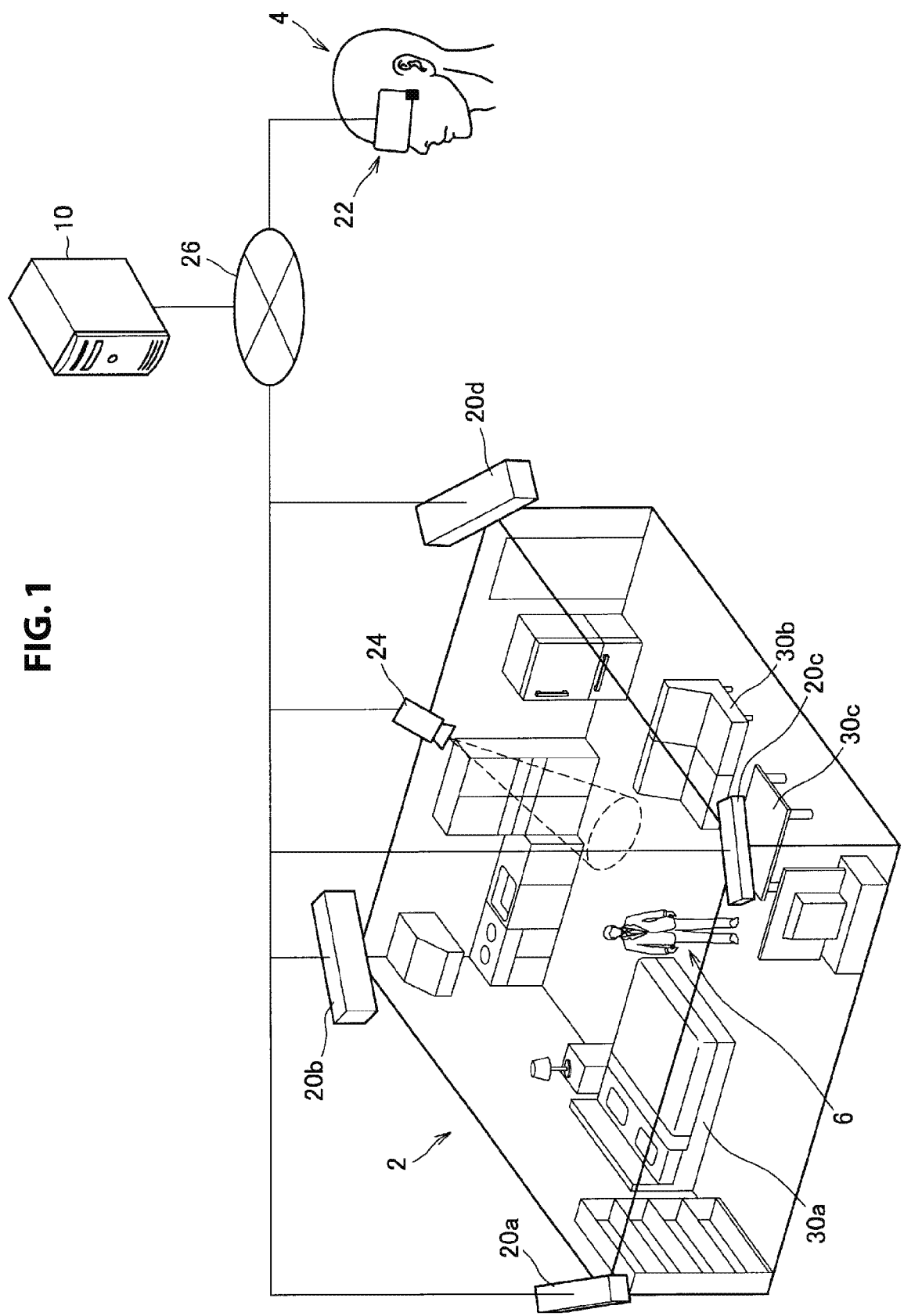
FIG. 1 is an explanatory diagram illustrating a configuration example of an information processing system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are also distinguished by attaching different letters after the same reference numerals. For example, a plurality of components having substantially the same functional configuration are distinguished like a server 10a and a server 10b if necessary. Here, in a case in which it is not necessary to particularly distinguish each of a plurality of constituent elements having substantially the same functional configuration, only the same reference numerals are attached. For example, in a case in which it is not necessary to particularly distinguish the server 10a and the server 10b from each other, they are simply referred to as a server 10.

Further, "modes for carrying out the invention" will be described in accordance with the order of items below.
1. First embodiment
2. Second embodiment
3. Hardware configuration
4. Modified example

1. FIRST EMBODIMENT

1-1. Configuration of Information Processing System

First, a first embodiment will be described. FIG. 1 is an explanatory diagram illustrating a configuration example of an information processing system according to a first embodiment. As illustrated in FIG. 1, the information processing system according to the first embodiment includes a server 10, a plurality of sensor units 20, a first display unit 22, a second display unit 24, and a communication network 26.

As illustrated in FIG. 1, in the first embodiment, a situation in which a plurality of sensor units 20 are arranged in a predetermined real space, and the plurality of sensor units 20 acquire three-dimensional information of substantially all of the predetermined real space is assumed. Here, the predetermined real space may be a room 2 or a corridor in a predetermined building such as a house, a shop, an office building, a leisure facility, or the like. Further, the following description will proceed focusing on an example in which a predetermined real space is a room 2 in a predetermined building.

Further, it is assumed that a plurality of objects 30 such as bed 30a, a sofa 30b, and table 30c are arranged in the room 2 as illustrated in FIG. 1. Further, as illustrated in FIG. 1, a user 6 having management authority for the room 2 (hereinafter also referred to as an "authorized person 6") such as a resident of the room 2 can be located in the room 2.

1-1-1. Sensor Units 20

Each of the sensor units 20 measures a distance to an object located in front of the sensor unit 20. For example, the sensor unit 20 may include a depth sensor, a stereo camera, or a range finder.

Further, the sensor units 20 further include, for example, image sensors (RGB cameras), and are able to capture images in front of the sensor units 20. Further, sensing data acquired by the plurality of sensor units 20 arranged in the room 2 can be synthesized with a high degree of accuracy by calibration, a frame synchronization process, or the like.

1-1-2. Server 10

The server 10 is an example of an information processing device in the present disclosure. The server 10 acquires the sensing data obtained by the plurality of sensor units 20 via the communication network 26 to be described later, and then generates content of a free viewpoint related to the room 2 on the basis of the acquired sensing data.

Further, the server 10 transmits the generated content of the free viewpoint to the first display unit 22 to be described later which is positioned outside the room 2 (such as a remote place) via the communication network 26 so that the content can be displayed on the first display unit 22.

Content of Free Viewpoint

Here, the content of the free viewpoint may be data for presenting a video (for example, a video of a real space or the like) from a free viewpoint position which is obtained on the basis of data obtained by sensing the real space from a plurality of viewpoints (the sensor units 20) (arranged at a plurality of points). For example, a three-dimensional virtual space can be constructed, for example, by integrating data obtained by sensing the real space simultaneously from a plurality of viewpoints. In this case, the content of the free viewpoint may be data presenting a video from a free viewpoint in the three-dimensional virtual space. For example, the content of the free viewpoint may be data presenting a video of a virtual space from a viewpoint when the viewpoint is virtually freely moved in the three-dimensional virtual space.

For example, in a case in which the content of the free viewpoint is displayed on a head mounted display (HMD) worn by the user, and the user performs a manipulation (for example, a manipulation, a voice command, or the like to a predetermined input device) for moving the viewpoint, the video from the moved viewpoint based on the manipulation can be displayed on the HMD. As described above, the user may be able to view the content by freely moving the viewpoint.

Further, the content of the free viewpoint may include three-dimensional information and color information indicating each object in the real space of a sensing target. For example, the content of the free viewpoint includes three-dimensional information indicating a position of each point of a virtual object corresponding to each object in the three-dimensional virtual space and color information of each point. Further, the content of the free viewpoint may further include audio information such as sounds collected by the plurality of sensor units 20.

1-1-3. First Display Unit 22

The first display unit 22 displays a video such as, for example, the content of the free viewpoint transmitted from the server 10. As illustrated in FIG. 1, the first display unit 22 may be, for example, a non-transmissive HMD. In this case, a user 4 located outside the room 2 can view the content of the free viewpoint transmitted from the server 10 through the first display unit 22 by wearing the first display unit 22. Accordingly, the user 4 can have an experience as if the user were actually located inside the room 2.

Further, the first display unit 22 is not limited to the non-transmissive HMD. For example, the first display unit 22 may be a transmissive eyeglasses type device such as a transmissive HMD or augmented reality (AR) glasses, a television receiver, a 3D television receiver, or the like. Alternatively, the first display unit 22 may be a 3D projector, and a video may be projected on, for example, a wall or a screen by the 3D projector. Further, the following description will proceed focusing on an example in which the first display unit 22 is a non-transmissive HMD.

1-1-4. Second Display Unit 24

The second display unit 24 may be a display device positioned in the room 2. For example, the second display unit 24 may be a projector or a 3D projector. In this case, the second display unit 24 can project video in the room 2 (for example, a wall or a screen) as illustrated in FIG. 1. Alternatively, the second display unit 24 is an eyeglasses type device such as an HMD or AR glasses and can be worn by the authorized person 6.

1-1-5. Communication Network 26

The communication network 26 is a wired or wireless transmission path of information transmitted from a device connected to the communication network 26. Examples of the communication network 26 may include a public line network such as a telephone network, the Internet, and a satellite communication network, various local area networks (LANs) including Ethernet (a registered trademark), and a wide area network (WAN). Further, the communication network 26 may include a dedicated network such as an Internet protocol-virtual private network (IP-VPN).

1-1-6. Description of Problem

The configuration of the information processing system according to the first embodiment has been described above. Incidentally, a situation in which the authorized person 6 does not want the user 4 (outside the room 2) to see a specific object or a specific space in the room 2 is also assumed. However, in the content of the free viewpoint, since the position or the direction of the viewpoint can be freely changed in a case in which no particular restriction is applied, the user who views the content is able to view the inside of the room 2 freely in detail. For this reason, there is a problem in that the privacy of the authorized person 6 is not protected.

In this regard, the server 10 according to the first embodiment was invented in light of the foregoing. According to the first embodiment, the server 10 can restrict, on the basis of a predetermined condition, viewing of a part of content corresponding to a partial space of the room 2 among content of the free viewpoint generated based on the sensing result of the room 2. Accordingly, it is possible to appropriately protect the privacy of the authorized person 6 while enabling the user 4 to view the content.

1-2. Configuration

Figure 2:
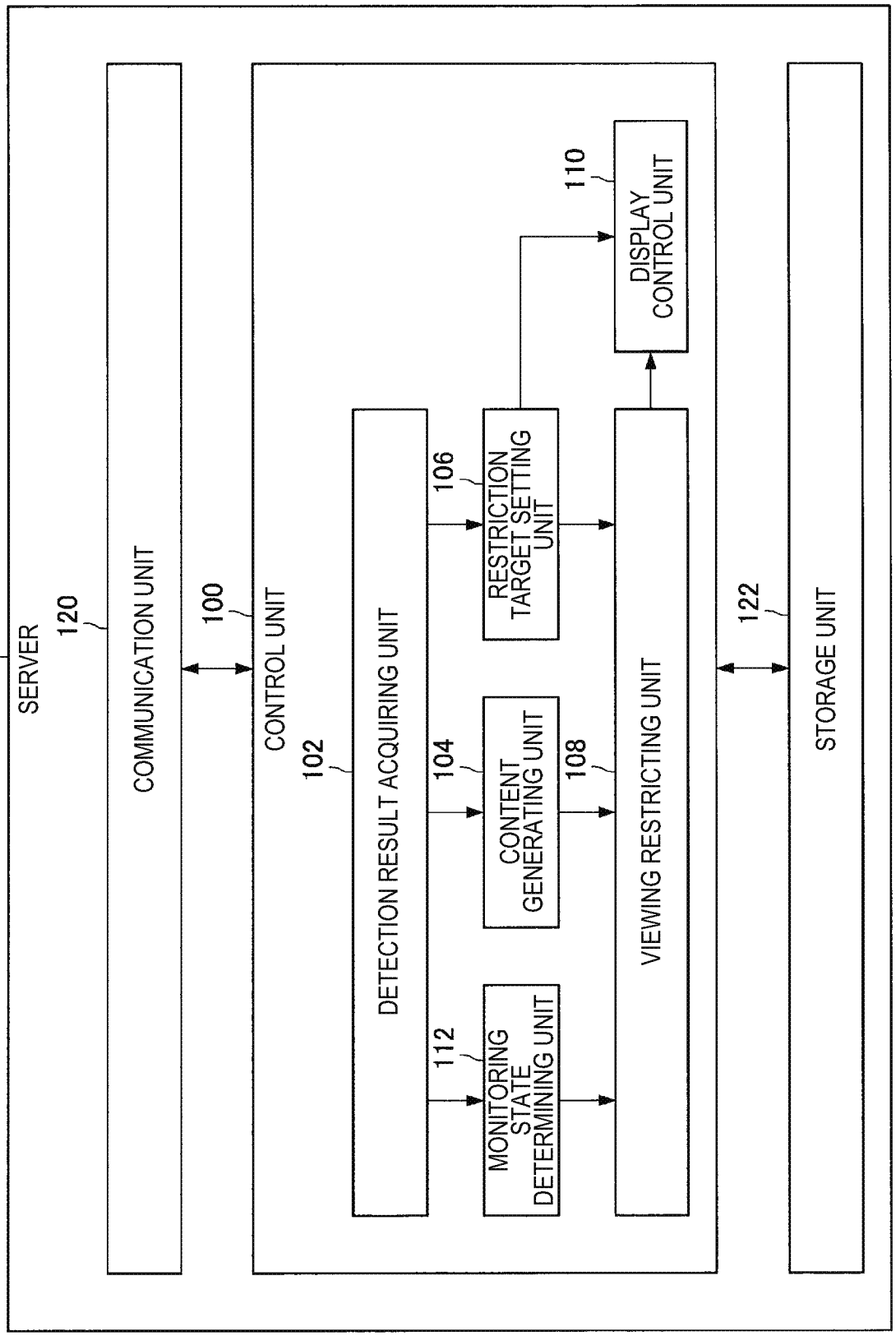
FIG. 2 is a functional block diagram illustrating a configuration example of a server 10 according to the first embodiment.

Next, a configuration of the server 10 according to the first embodiment will be described in detail. FIG. 2 is a functional block diagram illustrating a configuration example of the server 10 according to the first embodiment. As illustrated in FIG. 2, the server 10 has a control unit 100, a communication unit 120, and a storage unit 122.

1-2-1. Control Unit 100

The control unit 100 comprehensively controls the operation of the server 10 by using hardware such as a central processing unit (CPU) 150 and a random access memory (RAM) 154 to be described later which are installed in the server 10. Further, as illustrated in FIG. 2, the control unit 100 includes a detection result acquiring unit 102, a content generating unit 104, a restriction target setting unit 106, a viewing restricting unit 108, a display control unit 110, and a monitoring state determining unit 112.

1-2-2. Detection Result Acquiring Unit 102

The detection result acquiring unit 102 acquires the sensing result sensed by the plurality of sensor units 20. For example, the detection result acquiring unit 102 acquires distance information to an object located in front of the sensor units 20 detected by each individual sensor unit 20 (a depth sensor or the like) or a captured image captured by each sensor unit 20 (an image sensor, or the like) as the sensor data, by performing a reception or reading process or the like.

1-2-3. Content Generating Unit 104

The content generating unit 104 generates the content of the free viewpoint on the basis of the sensing data acquired by the plurality of sensor units 20 acquired by the detection result acquiring unit 102. For example, the content generating unit 104 first generates a point cloud as three-dimensional space information of substantially all of the room 2 on the basis of the distance information to each object located in front of each sensor unit 20 acquired by the detection result acquiring unit 102. Then, the content generating unit 104 generates the content of the free viewpoint related to the room 2 on the basis of the generated point cloud.

For example, each object in the room 2 can be specified on the basis of an image recognition result of one or more two-dimensional images captured by the plurality of sensor units 20. Then, the content generating unit 104 can generate the content of the free viewpoint by specifying three-dimensional information of each object on the basis of the one or more two-dimensional images and the generated point cloud data.

1-2-4. Restriction Target Setting Unit 106

The restriction target setting unit 106 sets the restriction target object from among a plurality of objects located in the room 2 or sets the restriction target space in the room 2. As will be described in detail, in the content of the free viewpoint generated by the content generating unit 104, viewing of parts corresponding to the set restriction target object and the restriction target space by the user 4 can be restricted by the viewing restricting unit 108. Further, the viewing of a part of the content corresponding to each object located within the restriction target space by the user 4 can also be restricted.

1-2-4-1. Pointing of Virtual Object

For example, the restriction target setting unit 106 sets the restriction target object and/or the restriction target space on the basis of an instruction of the authorized person 6 for the virtual object. By way of example, the restriction target setting unit 106 sets the restriction target object or the restriction target space on the basis of an input performed by the user on a predetermined manipulation screen indicating the layout of the room 2. Here, the manipulation screen can be displayed such that each of a plurality of objects located in the room 2 is can be selected by the user. For example, in a case in which the user selects an object in the manipulation screen and inputs whether or not the object is a restriction target, the restriction target setting unit 106 sets the object as a restriction target object or a non-restriction target object. Further, the manipulation screen can display a range inside the room 2 so that the user can designate it. For example, in a case in which the user designates a range in the manipulation screen and inputs whether or not the range is a restriction target, the restriction target setting unit 106 sets a space corresponding to the range as a restriction target space or a non-restriction target space. Further, the manipulation screen can be displayed on a display included in a predetermined terminal (for example, a general-purpose personal computer (PC), a tablet terminal, or the like) used by the authorized person 6 or a display device (for example, a liquid crystal display (LCD), an organic light emitting diode (OLED) connected to a predetermined terminal. Alternatively, the manipulation screen may be displayed by the second display unit 24.

Figure 3:
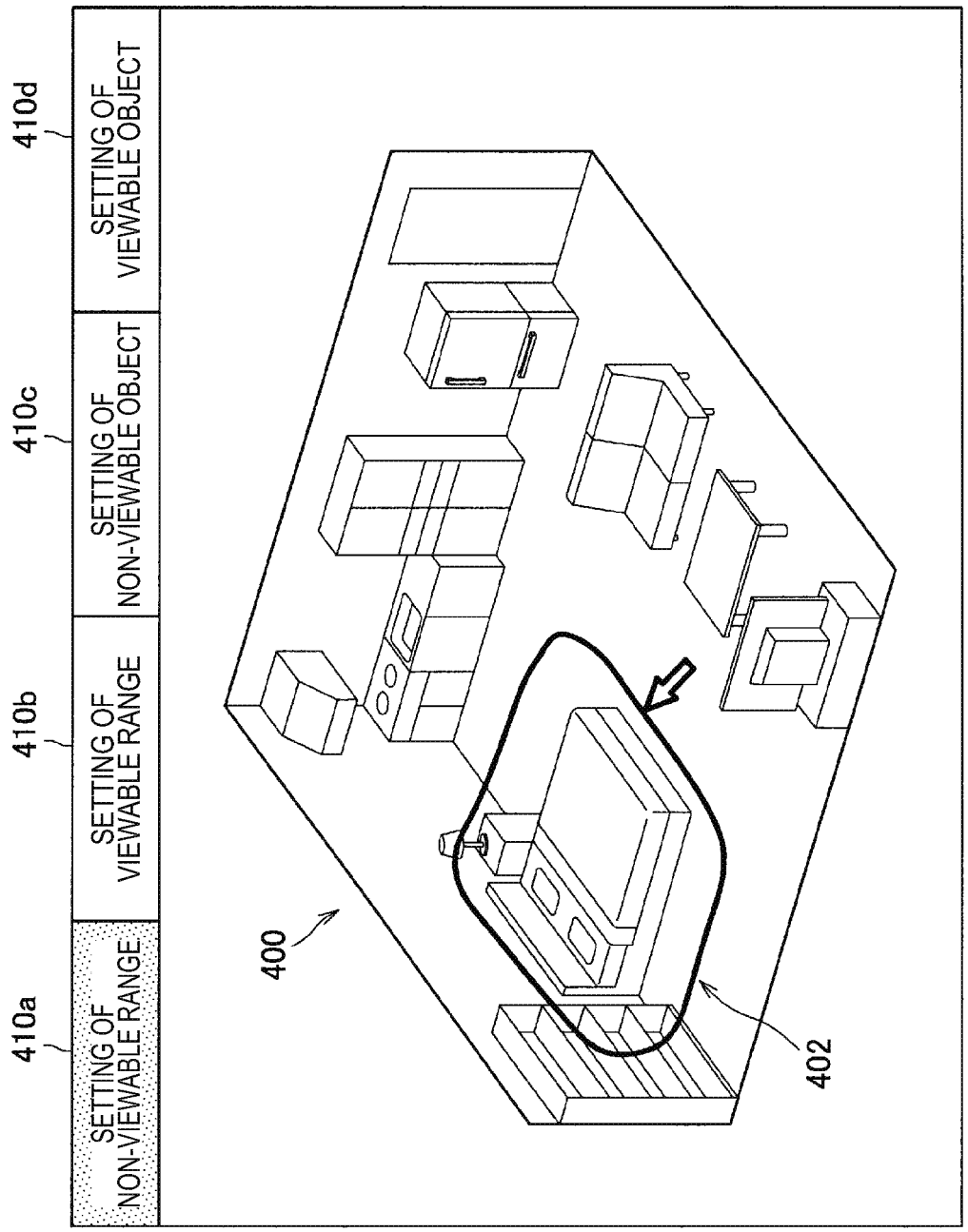
FIG. 3 is an explanatory diagram illustrating an example of a manipulation screen according to the first embodiment.

FIG. 3 is an explanatory diagram illustrating an example of the manipulation screen (manipulation screen 40). As illustrated in FIG. 3, a layout 400 of the room 2 is displayed in the manipulation screen 40. Further, FIG. 3 illustrates an example in which the layout 400 is 3D video (a point cloud, or the like) constituted by three-dimensional information of each object located in the room 2, but the present disclosure is not limited to such an example. For example, the layout 400 may be a floor plan of the room 2 or a 2D captured image indicating positional relations of individual objects in the room 2.

Further, as illustrated in FIG. 3, the manipulation screen 40 includes a restriction range setting button 410a, a non-restriction range setting button 410b, a restriction object setting button 410c, and a non-restriction object setting button 410d. Here, the restriction range setting button 410a is a button for setting the restriction target space in the room 2. Further, the non-restriction range setting button 410b is a button for setting the non-restriction target space in the room 2. Further, for example, the restriction object setting button 410c is a button for setting the restriction target object from among a plurality of objects arranged in the room 2. Further, for example, the non-restriction object setting button 410d is a button for setting a non-restriction target object from among a plurality of objects arranged in the room 2. Further, FIG. 3 illustrates a state in which the restriction range setting button 410a is selected. In this state, as illustrated in FIG. 3, if a range is designated in the layout 400 of the room 2 by, for example, a drag manipulation, the restriction target setting unit 106 newly sets a space corresponding to a designated range 402 (a bed area in the example illustrated in FIG. 3) as the restriction target space.

Further, if one of the objects displayed in the layout 400 of the room 2 is selected by the user in a state in which the restriction object setting button 410c is selected, the restriction target setting unit 106 newly sets the selected object as the restriction target object. Further, when the restriction target object and the restriction target space are newly set, a display form may be changed, for example, the corresponding object or the corresponding space may be grayed out in the manipulation screen (the layout 400 or the like). Accordingly, it is possible to clearly indicate the set restriction target object and the set restriction target space.

Modified Examples

Further, as a modified example, a restriction object list may be placed in the manipulation screen, and the restriction target object may be newly set by a manipulation on the restriction object list. For example, if any one of a plurality of objects displayed on the layout 400 is moved to the restriction object list by drag & drop, the restriction target setting unit 106 may newly set the object as the restriction target object.

Further, as another modified example, the restriction target setting unit 106 may also set the restriction target object or the restriction target space on the basis of a manipulation and speech recognition performed by the user using a predetermined UI (for example, a string UI) in the manipulation screen. For example, in a case in which the range is designated in the manipulation screen by a manipulation on the string UI, and a predetermined voice command (for example, "NG!," "OK!," or the like) is recognized, the restriction target setting unit 106 may newly set the space corresponding to the designated range as the restriction target space (or the non-restriction target space). Alternatively, in this case, the restriction target setting unit 106 may newly set the object located in the space corresponding to the designated range as the restriction target object (or the non-restriction target object).

Further, as another modified example, the authorized person 6 may be able to designate the restriction target object and the restriction target space for each user 4 (who views content).

1-2-4-2. Pointing of Real Object

Setting by Gesture

Further, the restriction target setting unit 106 can set the restriction target object and/or the restriction target space on the basis of an instruction of the user with respect to the real object. For example, the restriction target setting unit 106 sets the restriction target object and/or the restriction target space on the basis of detection of a gesture of the user (for example, a line of sight, pointing, a touch, or the like) with respect to the real object. As an example, in a case in which it is detected that the user is touching or pointing at a certain object in the room 2, and a voice command for object designation based on the gesture (for example, "Do not display this!," "Display this!," or the like) is recognized, the restriction target setting unit 106 may newly set the object as the restriction target object (or the non-restriction target object). Further, in a case in which a gesture such as drawing a circle with a hand (or a finger) in the room 2 is detected, and a voice command for range designation based on the gesture (for example, "Do not display this range!," "Display this range!," or the like) is recognized, the restriction target setting unit 106 may newly set a space in the room 2 corresponding to the range designated by the gesture as the restriction target space (or the non-restriction target space).

Further, in a case in which the voice command (for example, "Do not display this," "Display this!," or the like) for object designation based on the line of sight is recognized while the line of sight direction of the user is being detected, the restriction target setting unit 106 may newly set an object located in the line of sight direction detected at the time of recognition in the room 2 as the restriction target object (or the non-restriction target object).

Setting by Movement

Further, the restriction target setting unit 106 can set the restriction target object and/or the restriction target space on the basis of detection of movement of the user in the room 2 and speech recognition. For example, in a case in which a voice command for range designation based on movement (for example, "Do not display walking range from now on!," "Display walking range from now on!," or the like) is recognized, the restriction target setting unit 106 may newly set a space corresponding to a region in which the user is recognized as moving in the room 2 as the restriction target space (or the non-restriction target space). Further, in this case, the restriction target setting unit 106 may newly set each of one or more objects located in the space corresponding to the region in which the user is recognized as moving in the room 2 after the recognition as the restriction target object (or the non-restriction target object).

Figure 4C:
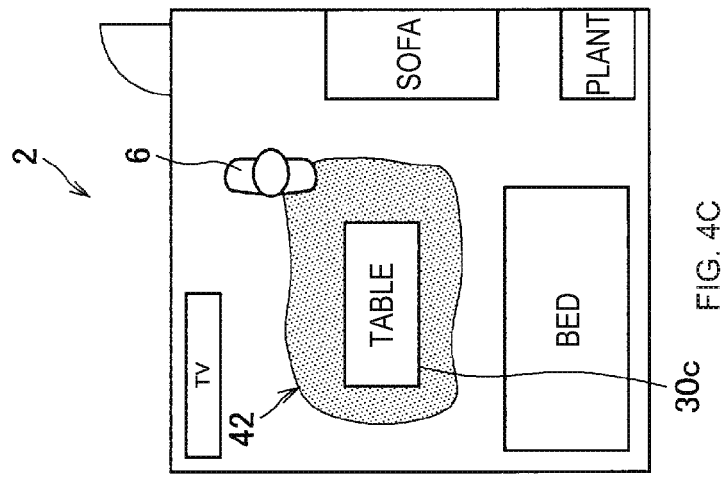
FIGS. 4A, 4B, and 4C are explanatory diagrams illustrating an example in which a restriction target space is set on the basis of movement and speech of a user in a room 2.
Figure 4B:
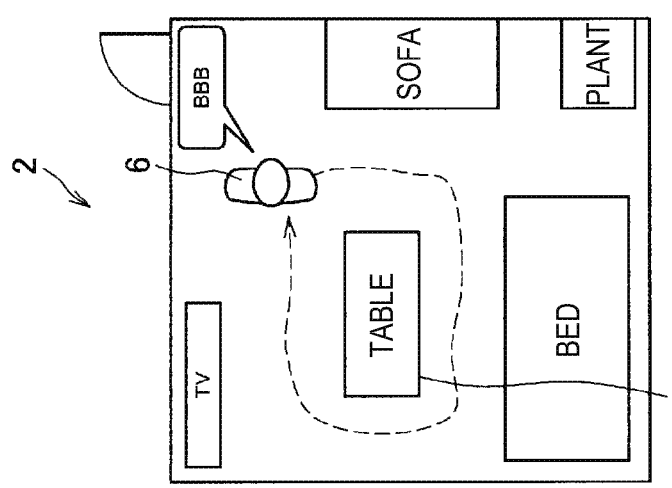
Figure 4A:
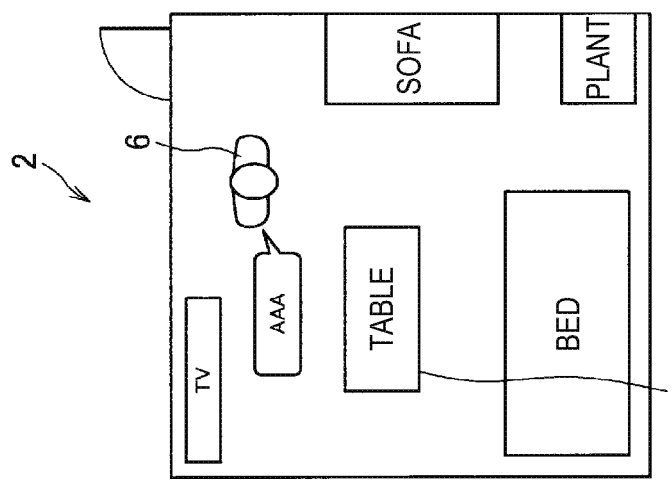

Here, the above setting example will be described in further detail with reference to FIGS. 4A, 4B, and 4C. As illustrated in FIG. 4A, first, the user 4 is assumed to give a voice command for starting range designation based on movement (such as "Do not display walking range from now on!" or the like) and then move in the room 2. Thereafter, as illustrated in FIG. 4B, the user 4 is assumed to give a voice command for ending the range designation based on the movement (such as "End settings!"). In this case, as illustrated in FIG. 4C, the restriction target setting unit 106 sets the space 42 corresponding to the range in which the user is recognized as moving in the room 2 as the restriction target space. Further, the restriction target setting unit 106 may set the table 30*c* located in the space 42 as the restriction target object.

Setting by Arrangement of Object

Further, the restriction target setting unit 106 can set the restriction target object and/or the restriction target space on the basis of a recognition result for positions of a plurality of predetermined objects arranged in the room 2. For example, the restriction target setting unit 106 may newly set the space corresponding to the range surrounded by three or more predetermined objects arranged in the room 2 as the restriction target space (or the non-restriction target space). Further, in this case, the restriction target setting unit 106 may newly set one or more objects located in the space corresponding to the range surrounded by the three or more predetermined objects as the restriction target objects (or the non-restriction target object).

1-2-4-3. Automatic Setting

Further, the restriction target setting unit 106 can automatically set the restriction target object and/or the restriction target space on the basis of the detection result acquired by the detection result acquiring unit 102. For example, in a case in which it is detected that there is an object matching a predetermined attribute in the room 2, the restriction target setting unit 106 sets the object as the restriction target object. By way of example, the restriction target setting unit 106 may set an object with a relatively high degree of privacy such as a letter or clothing as the restriction target object. Further, the restriction target setting unit 106 sets an object recognized as being dirty (located in the room 2) on the basis of an analysis result or the like for a captured image acquired by the detection result acquiring unit 102 as the restriction target object.

Further, in a case in which it is detected that there is a space matching a predetermined attribute in the room 2, the restriction target setting unit 106 can set the space as the restriction target space. As an example, the restriction target setting unit 106 may set a space with a relatively high degree of privacy such as a kitchen, a bedroom, or a toilet, as the restriction target space. Further, the restriction target setting unit 106 may set a space (for example, a toilet) in which an average stay time of the user is smaller than a predetermined threshold value as the restriction target space. Further, the restriction target setting unit 106 may set a space (for example, a bedroom) where a visiting frequency of the user is smaller than a predetermined threshold value as the restriction target space.

1-2-5. Viewing Restricting Unit 108

The viewing restricting unit 108 restricts viewing of a part of content corresponding to a partial space of the room 2 among the content generated by the content generating unit 104 on the basis of a predetermined condition. For example, in a case in which the predetermined condition is satisfied, the viewing restricting unit 108 restricts the viewing of a part of content. Further, in a case in which the predetermined condition is not established, the viewing restricting unit 108 does not restrict the viewing of the content.

Here, a partial space of the room 2 may be a space satisfying the predetermined condition of the room 2. Further, spaces satisfying the predetermined condition may include a space including the restriction target object set by the restriction target setting unit 106 and the restriction target space.

1-2-5-1. Restriction of Movement of Viewpoint

A restriction example of the viewing of the content by the viewing restricting unit 108 will be described below in further detail. For example, the viewing restricting unit 108 restricts movement of a viewpoint in a part of content corresponding to the restriction target object and the restriction target space. As an example, the viewing restricting unit 108 does not permit movement of the viewpoint to a part of the content corresponding to the inside of the restriction target space. Further, the viewing restricting unit 108 permits movement of the viewpoint to a part of the content corresponding to the outside of the restriction target space.

1-2-5-2. Restriction of Display

Figure 5:
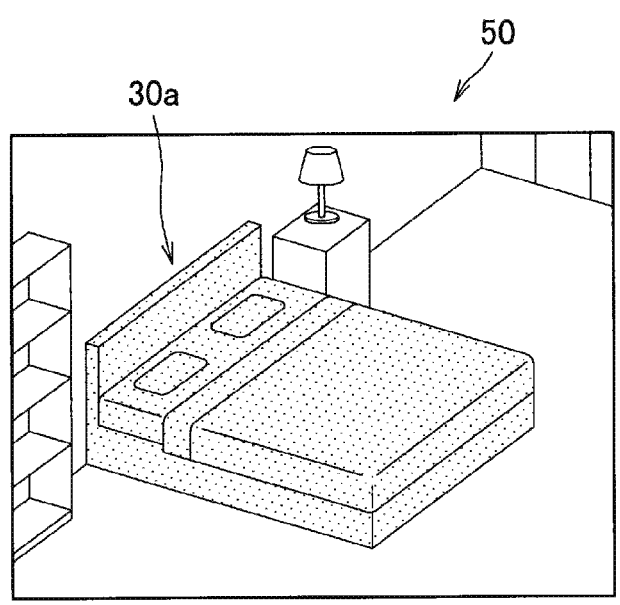
FIG. 5 is an explanatory diagram illustrating a display example of content of a free viewpoint when a bed 30a is set as a restriction target object.

Further, the viewing restricting unit 108 can control display of the content so that the visibility of the part of the content corresponding to the restriction target object and the restriction target space is lowered. For example, the viewing restricting unit 108 performs image processing so that the part of the content corresponding to the restriction target object and the restriction target space is unable to be viewed in detail. As an example, the viewing restricting unit 108 may perform a process of filling the part of the content corresponding to the restriction target object and the restriction target space with a predetermined color such as, for example, black. For example, in a case in which the bed 30*a* is set as the restriction target object, the viewing restricting unit 108 fills a part of content 50 corresponding to the bed 30*a* in the room 2 with a predetermined color such as black as illustrated in FIG. 5.

Alternatively, the viewing restricting unit 108 may perform a mosaic process on the part of the content or may perform a blurring process on the part. Alternatively, the viewing restricting unit 108 may cause each restriction target object (and each object located in the restriction target space) to be displayed in a wire frame or replace with each restriction target object with another separate object such as a rectangular parallelepiped. According to such restrictive examples, things located in regard to the restriction target object and the restriction target space in the room 2 can be checked by the user 4 (who views the content), but it is possible to apply restriction so that the details thereof are not visible.

Alternatively, the viewing restricting unit 108 may perform a process of increasing the transparency of the part of the content. For example, the viewing restricting unit 108 may set the transparency of the part of the content to 100% (that is, may cause it to be completely transparent).

Further, the viewing restricting unit 108 may perform a process of hollowing out the part of the content corresponding to the restriction target object and the restriction target space (that is, may cause the part of the content to be hidden). Further, as a modified example, the viewing restricting unit 108 may perform image processing for removing a dirt on the object recognized as being dirty.

1-2-5-3. Dynamic Restriction

Relationship

Further, the viewing restricting unit 108 can dynamically change a part of the content whose viewing is restricted on the basis of a predetermined condition. Here, the predetermined condition may include a condition related to data indicating a relationship (such as a degree of intimacy) between the user 4 viewing content and the authorized person 6. Here, the data indicating the relationship is, for example, data obtained from registration information of the user 4 or the authorized person 6 in a predetermined social networking service (SNS), data indicating a state of a contract between the user 4 and the authorized person 6, or the like.

For example, in a case in which the user 4 is specified a family of the authorized person 6, the viewing restricting unit 108 may not restrict the viewing of the content (that is, may not restrict viewing of even a part of the content corresponding to the restriction target object and the restriction target space). Further, in a case in which the user 4 is specified as a friend of the authorized person 6, the viewing restricting unit 108 may not restrict viewing of the part of the content corresponding some objects among the restriction target objects set by the restriction target setting unit 106 and a partial space among the restriction target spaces.

Further, the viewing restricting unit 108 can also dynamically change the part where viewing is restricted on the basis of a change in the data indicating the relationship between the user 4 and the authorized person 6. For example, in a case in which it is specified that the degree of intimacy between the user 4 and the authorized person 6 has increased (for example, it is specified that friend registration is newly performed between the user 4 and the authorized person 6 in a predetermined SNS), the viewing restricting unit 108 may reduce the number of objects whose viewing is restricted, reduce a range of the space whose viewing is restricted, or increase a range in which the viewpoint can be moved in the room 2. Further, in a case in which a predetermined contract related to viewing of content is made between the user 4 and the authorized person 6, and completion of the contract is registered in the storage unit 122 or the like, the viewing restricting unit 108 may reduce the number of objects whose viewing is restricted, reduce the range of the space whose viewing is restricted, or increase the range in which the viewpoint can be moved in the room 2 depending on content of the contract.

Here, for example, the predetermined contract may be a contract which permits a worker (the user 4) to see or remote control a device installed in the room 2 from a remote place when the device is broken. Alternatively, for example, the predetermined contract may be a contract which permits a shop clerk (the user 4) to confirm whether or not furniture or a device which the authorized person 6 is scheduled to purchase can be placed in the room 2 from a remote place.

Accounting State

Further, the "predetermined condition" may include a condition related to data indicating an accounting state of the user 4 viewing the content or a registration state of a paying member of the user 4 (for example, whether or not the user is a paying member, a membership grade, or the like). Here, the data indicating the accounting status of the user 4 or the data indicating the registration state of the paying member of the user 4 may be managed by the server 10, and for example, the data may be stored in the storage unit 122 or may be managed by an external device (not illustrated).

For example, the viewing restricting unit 108 may reduce the restriction related to the viewpoint and the visibility at the time of content viewing as it is specified that an amount paid by the user 4 is larger. As an example, in a case in which the room 2 is an event venue such as music, and the user 4 is specified as a free member, the viewing restricting unit 108 restricts the viewing of the content so that only a video in which a front of a stage is reduced and displayed is viewable (that is, the user 4 is located at an audience seat far from the stage). Further, in a case in which it is specified that the user 4 pays a low amount of fee, the viewing restricting unit 108 enlarges and displays the stage but restricts the viewing of the content so that the video is viewable only from the front of the stage (that is, the user 4 is located at an audience seat near the stage). Further, in a case in which it is specified that the user 4 pays a large amount of fee, the viewing restricting unit 108 may not restrict the movement of the viewpoint in principle. Accordingly, the user 4 can freely move the viewpoint on the stage, for example, can move the viewpoint to the side or the back of a person on the stage.

Further, in a case in which it is specified that a plurality of persons are on the stage, and the user 4 pays a low amount of fee, the viewing restricting unit 108 may restrict the viewing of the content so that only several persons among a plurality of persons are displayed. Further, in a case in which it is specified that the user 4 pays a high amount of fee, the viewing restricting unit 108 may cause all of a plurality of persons to be displayed.

Presence or Absence of Person

Further, the predetermined condition may include detection of the presence of a person in the room 2. For example, in a case in which the number of persons (such as the authorized persons 6) located in the room 2 is one or more, the person may be able to check a behavior (viewpoint movement state) of the user 4 viewing content. In this regard, in a case in which it is detected that there is at least one person in the room 2, the viewing restricting unit 108 may enlarge the range in which the viewpoint can be moved in the room 2. Further, in a case in which it is detected that there is no person in the room 2, the viewing restricting unit 108 may reduce the range in which the viewpoint can be moved in the room 2.

Designation of Authorized Person 6

Further, the predetermined condition may also include detection of a manipulation for changing the restriction target object or the restriction target space by the authorized person 6 while the content is being viewed. For example, each time a manipulation for changing the restriction target object or the restriction target space is detected, the viewing restricting unit 108 may sequentially change the object or the space whose viewing is restricted in accordance with the detected manipulation.

As an example, in a case in which the authorized person 6 designates a certain point in the room 2, and a voice command for restriction range designation (for example, "Do not display it from now on!") is recognized, the viewing restricting unit 108 may perform a blurring process on all parts of the content corresponding to an inner space from the designated point in the room 2 or may prohibit (restrict) the movement of the viewpoint of the user 4 to the part of the content. Alternatively, in this case, the viewing restricting unit 108 may control display of the content such that all objects other than a specific object (for example, a person) located in the inner space from the designated point are not displayed (that is, may cause only the specific object to be displayed).

Monitoring

Further, the "predetermined condition" may include determining that the room 2 is being monitored by the monitoring state determining unit 112 to described later. For example, in a case in which the monitoring state determining unit 112 determines that the room 2 is being monitored, the viewing restricting unit 108 may reduce the range of the space whose viewing is restricted. Further, in a case in which the monitoring state determining unit 112 determines that the room 2 is not being monitored, the viewing restricting unit 108 may enlarge or maintain the range of the space whose viewing is restricted.

Specific Object

Further, the predetermined condition may include detection of the presence of a specific object (for example, a pet or a child) in the room 2. For example, in a case in which it is detected that there is a specific object in the room 2, the viewing restricting unit 108 may restrict the viewing of the content so that the entire room 2 is unable to be viewed. Further, the specific object may be designated by the authorized person 6 or may be set by a system administrator in advance.

1-2-6. Display Control Unit 110

The display control unit 110 causes the first display unit 22 to display the content of the free viewpoint which has undergone the process by the viewing restricting unit 108. Further, the display control unit 110 controls the display for the second display unit 24 (positioned in the room 2).

1-2-6-1. Display of Restriction Target Object and Restriction Target Space

Further, for example, in a situation in which the user 4 who is viewing the content generated by the content generating unit 104 and the authorized person 6 are communicating in real time, for example, using a telephone, if the authorized person 6 talks about an object whose viewing is restricted, the talk is assumed not to mesh between the user 4 and the authorized person 6. In this regard, it is desirable that the display control unit 110 causes information indicating the part of the content whose viewing is currently limited to be displayed on the second display unit 24 (positioned in the room 2). For example, the display control unit 110 may causes the second display unit 24 to display, for example, a line of a predetermined color around the object and the space in the room 2 corresponding to the part whose viewing is restricted in the content or may cause the second display unit 24 to display a predetermined icon at the position (or the vicinity) of the object and the space.

Figure 6:
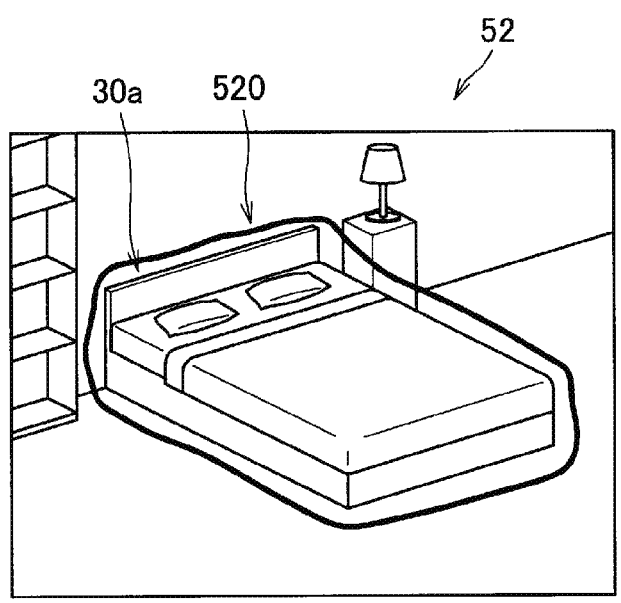
FIG. 6 is an explanatory diagram illustrating a display example by a second display unit 24 when a bed 30a is set as a restriction target object.

FIG. 6 is an explanatory view illustrating a display example by the second display unit 24 when the bed 30a arranged in the room 2 is set as the restriction target object. As illustrated in FIG. 6, for example, the display control unit 110 causes the second display unit 24 to display a line 520 of a predetermined color at a display position corresponding to the periphery of the bed 30a.

According to such display examples, the authorized person 6 in the room 2 can understand the part which the user 4 viewing the content is currently restricted from viewing in real time. Therefore, the authorized person 6 can determine that the object should not be not talked, it is possible to prevent communication insufficiency between the authorized person 6 and the user 4.

Modified Examples

Further, in a case in which a plurality of users located outside the room 2 are simultaneously viewing the content, the display control unit 110 can also cause the second display unit 24 to display information indicating the part whose viewing is restricted for each of a plurality of users in association with the user. For example, the display control unit 110 may cause the second display unit 24 to display a line of a color previously associated with the user around the range of the object and the space in the room 2 corresponding to the part whose viewing is restricted for the user for each user. Alternatively, the display control unit 110 may cause an icon of a type associated with the user or identification information of the user to be displayed at the position (or in the vicinity) of the object and the space in the room 2 corresponding to the part whose viewing is restricted for to the user for each user.

According to this display example, in a situation in which a user 4a and a user 4b are viewing the same content, it is possible to inform the authorized person 6 that the user 4a is able to view a certain object in the room 2 but the viewing of the user 4b is restricted.

1-2-6-2. Display of Viewing User

Figure 7A:
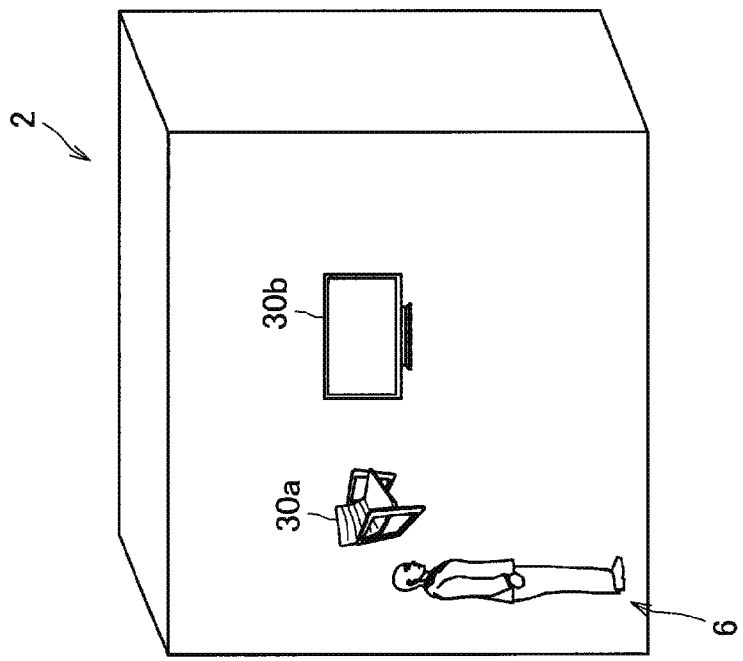
FIGS. 7A and 7B are explanatory diagrams illustrating a display example of a video 32 of a user viewing content on a second display unit 24.
Figure 7B:
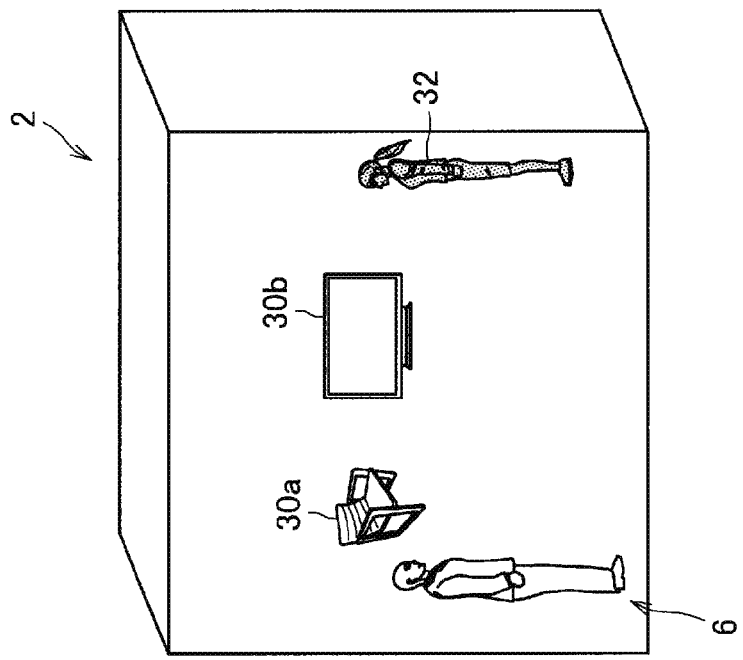

Further, as illustrated in FIG. 7B, the display control unit 110 may cause the second display unit 24 (positioned in the room 2) to displays a video 32 of the user viewing the content. Further, at this time, the display control unit 110 may adjust a direction of the video 32 of the user, for example, in accordance with a direction in which the user 4 is viewing in the content detected by the first display unit 22 or the like worn by the user 4.

Further, as a modified example, the viewing restricting unit 108 may restrict the viewing of the content (by the user 4) on the basis of detection of a motion of the authorized person 6 of hiding an eye part in the video 32 of the user with the hand. For example, in a case in which the motion is detected, the viewing restricting unit 108 may prohibit the viewing of the content (may not display all) or may not display the part of the content corresponding to the object and the space position in the line of sight direction of the user.

1-2-7. Monitoring State Determining Unit 112

The monitoring state determining unit 112 determines whether or not the room 2 is being monitored by the authorized person 6 on the basis of a predetermined criterion. For example, in a case in which it is detected that the authorized person 6 is positioned in the room 2 or in the vicinity of the room 2, the monitoring state determining unit 112 determines that the room 2 is being monitored. Further, when the server 10 receives a measurement result of a global positioning system (GPS) receiver in a terminal carried by the authorized person 6, an image captured by the sensor unit 20, or the like, the monitoring state determining unit 112 can determine whether or not the authorized person 6 is positioned in the room 2 (or in the vicinity of the room 2).

Further, in a case in which a predetermined terminal used by the authorized person 6 is displaying a video captured by one or more sensor unit 20 or another camera (not illustrated) arranged in the room 2, the monitoring state determining unit 112 determines whether or not the room 2 is being monitored on the basis of whether or not the predetermined terminal is located in the field of view of the authorized person 6 or in the vicinity of the field of view. For example, in a case in which the predetermined terminal is located in the field of view of the authorized person 6 or in the vicinity of the field of view, the monitoring state determining unit 112 determines that the room 2 is being monitored. Further, in a case in which the predetermined terminal is located outside the field of view of the authorized person 6, the monitoring state determining unit 112 determines that the room 2 is not monitored. Further, in a case in which the server 10 receives the video captured by an in-camera installed in the predetermined terminal, the monitoring state determining unit 112 can determine whether or not the predetermined terminal is located in the field of view of the authorized person 6 or in the vicinity of the field of view.

Further, the monitoring state determining unit 112 can also determine whether or not the room 2 is being monitored on the basis of an access state of the predetermined terminal to one or more sensor units 20 or another cameras arranged in the room 2. For example, in a case in which it is detected that the predetermined terminal is accessing at least one of the cameras, the monitoring state determining unit 112 determines that the room 2 is being monitored.

1-2-8. Communication Unit 120

The communication unit 120 performs transmission and reception information with other devices. For example, the communication unit 120 transmits the content of the free viewpoint which has undergone the process by the viewing restricting unit 108 to the first display unit 22 under the control of the display control unit 110. Further, the communication unit 120 receives the sensing data sensed by each of a plurality of sensor units 20 from a plurality of sensor units 20.

1-2-9. Storage Unit 122

The storage unit 122 stores various types of data or various types of software. For example, the storage unit 122 stores information of the restriction target object and the restriction target space set by the restriction target setting unit 106.

1-3. Flow of Process

The configuration according to the first embodiment has been described above. Next, an example of a flow of a process according to the first embodiment will be described with reference to "1-3-1. Flow of process when restriction target object or restriction target space is set" to "1-3-2. Flow of process when content is displayed." Further, the "flow of a process when a restriction target object or a restriction target space is set" and the "flow of a process when content is displayed" can be executed in parallel.

Figure 8:
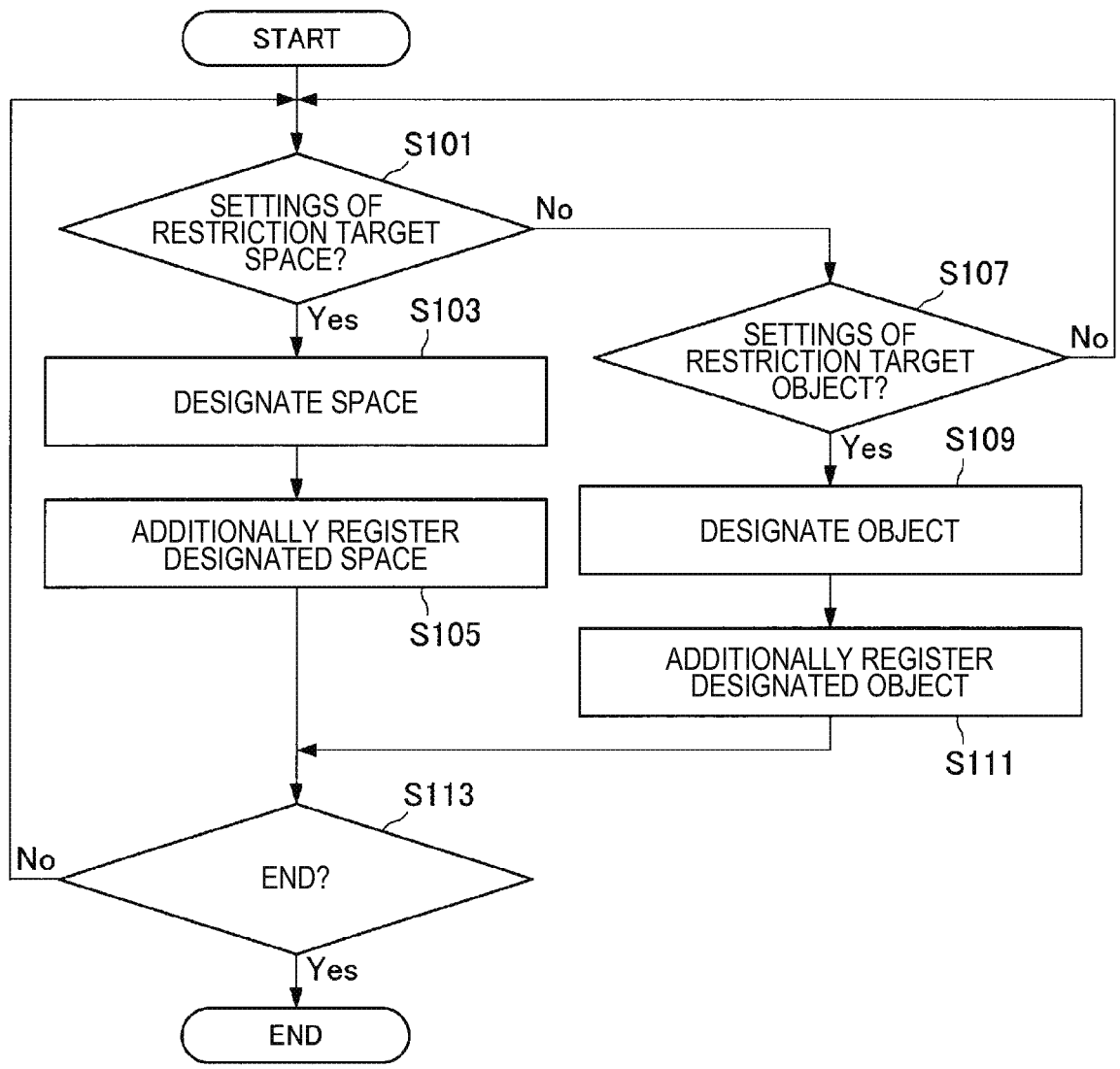
FIG. 8 is a flowchart illustrating "the flow of a process when a restriction target object or a restriction target space is set" according to the first embodiment.

1-3-1. Flow of Process when Restriction Target Object or Restriction Target Space is Set First, the "flow of a process when a restriction target object or a restriction target space is set" will be described with reference to FIG. 8. As illustrated in FIG. 8, the authorized person 6 manipulates a terminal such as a general-purpose PC and activates a setting tool. Then, in a case in which the authorized person 6 selects settings of the restriction target space in the setting tool (Yes in S101), the authorized person 6 then designates the space in the room 2 which is desired to be set as the restriction target (S103).

Thereafter, the terminal transmits the information of the space designated in S103 to the server 10. Then, the restriction target setting unit 106 of the server 10 sets the space indicated by the received information as the restriction target space. Then, the restriction target setting unit 106 additionally registers the set information in the storage unit 122 (S105). Thereafter, a process of S113 is executed.

On the other hand, in a case in which the authorized person 6 selects the settings of the restriction target object (No in S101 and Yes in S107), the authorized person 6 then sets an object which is desired to be set as the restriction target (S109).

Then, the terminal transmits information of the object designated in S109 to the server 10. Then, the restriction target setting unit 106 of the server 10 sets the object indicated by the received information as the restriction target object. Then, the restriction target setting unit 106 additionally registers the set information in the storage unit 122 (S111).

Thereafter, in a case in which an end of the setting tool is input (Yes in S113), the present process ends. On the other hand, in a case in which the end of the setting tool is not input (No in S113), the process starting from S101 is executed again.

Further, in a case in which the authorized person 6 does not select the settings of the restriction targets in S107 (No in S107), the process of S101 is executed again.

1-3-2. Flow of Process when Content is Displayed

Figure 9:
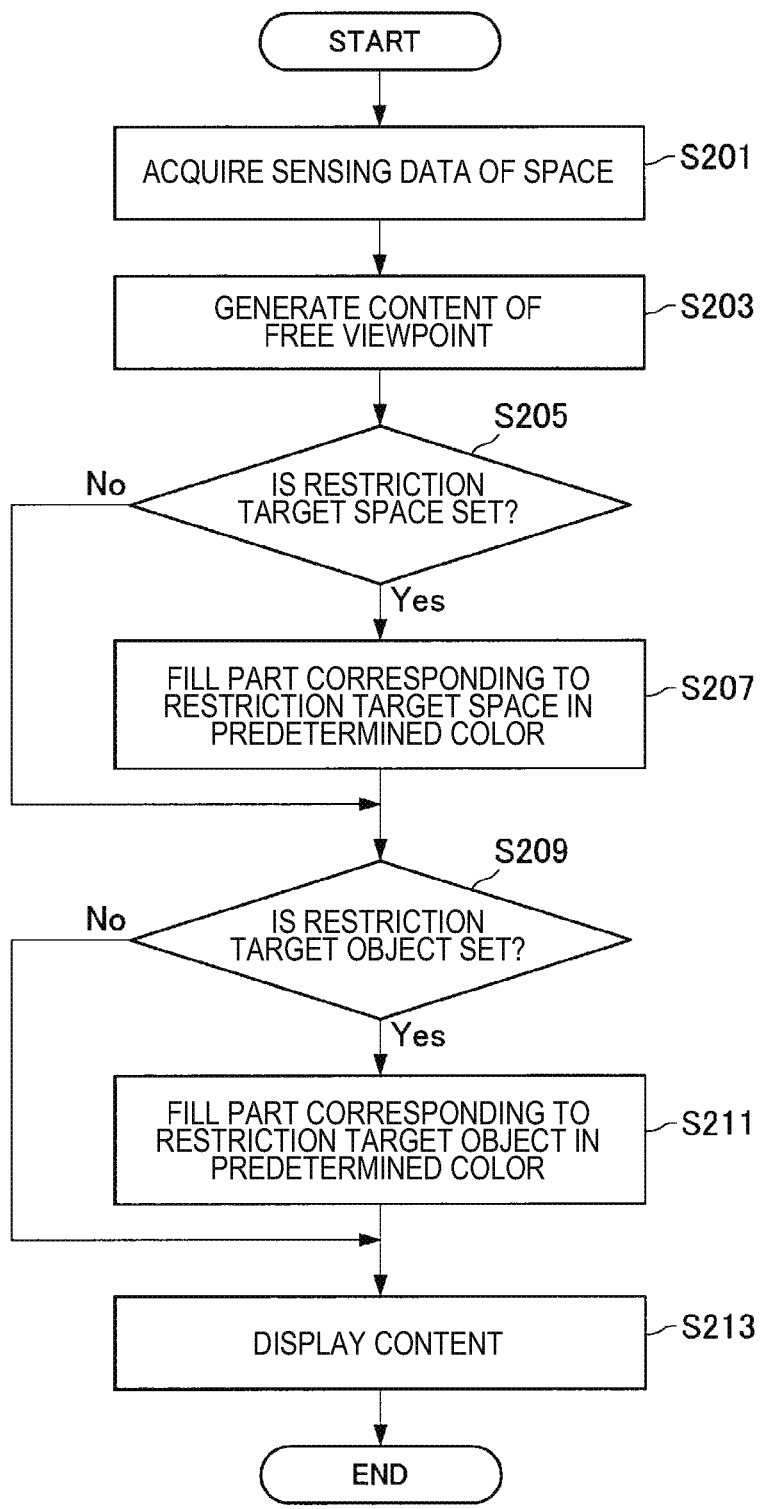
FIG. 9 is a flowchart illustrating "the flow of a process when content is displayed" according to the first embodiment.

Next, the "flow of a process when content is displayed" will be described with reference to FIG. 9. As illustrated in FIG. 9, first, the server 10 receives the sensing data of the room 2 sensed by each of a plurality of sensor units 20 from a plurality of sensor units 20 (S201).

Then, the content generating unit 104 generates the content of the free viewpoint related to the room 2 on the basis of the received sensing data (S203).

Thereafter, the viewing restricting unit 108 checks whether or not the restriction target space is set (S205). In a case in which the restriction target space is not set at all (No in S205), the viewing restricting unit 108 performs a process of S209 to be described later.

On the other hand, in a case in which the restriction target space is set (Yes in S205), the viewing restricting unit 108 fills the part of the content generated in S203 corresponding to each of the spaces of all the set restriction targets, for examples, with a predetermined color such as black (S207).

Thereafter, the viewing restricting unit 108 checks whether or not the restriction target object is set (S209). In a case in which the restriction target object is not set at all (No in S209), the viewing restricting unit 108 performs a process of S213 to be described later.

On the other hand, in a case in which the restriction target object is set (Yes in S209), the viewing restricting unit 108 fills the part of the content which has undergone the process of S207 or the part of the content generated in S203 corresponding to each of the objects of all the set restriction targets with a predetermined color such as black (S211).

Thereafter, the communication unit 120 transmits the content to the first display unit 22 under the control of the display control unit 110. Then, the first display unit 22 displays the received content (S213).

1-4. Effects

As described above, according to the first embodiment, the server 10 generates the content of the free viewpoint on the basis of the sensing result for the room 2, and restricts the viewing of a part of content corresponding to a partial space of the room 2 among the content of the free viewpoint on the basis of a predetermined condition. Accordingly, the viewing of the content can be appropriately restricted.

For example, the server 10 restricts the movement of the viewpoint in a part of content corresponding to the set restriction target object and the set restriction target space among the content of the free viewpoint or controls the display of the content by causing the visibility of the part of content to be lowered. Therefore, the authorized person 6 can restrict the viewing of the part in the content, for example, by designating an object or space which is not desired to be seen by the outside user 4 among the objects or the spaces located in the room 2 as the restriction target object or the restriction target space. Therefore, the privacy of the authorized person 6 can be adequately protected while partially allowing the viewing of the content of the free viewpoint by the outside user 4.

2. SECOND EMBODIMENT

2-1. Configuration of Information Processing System

Figure 10:
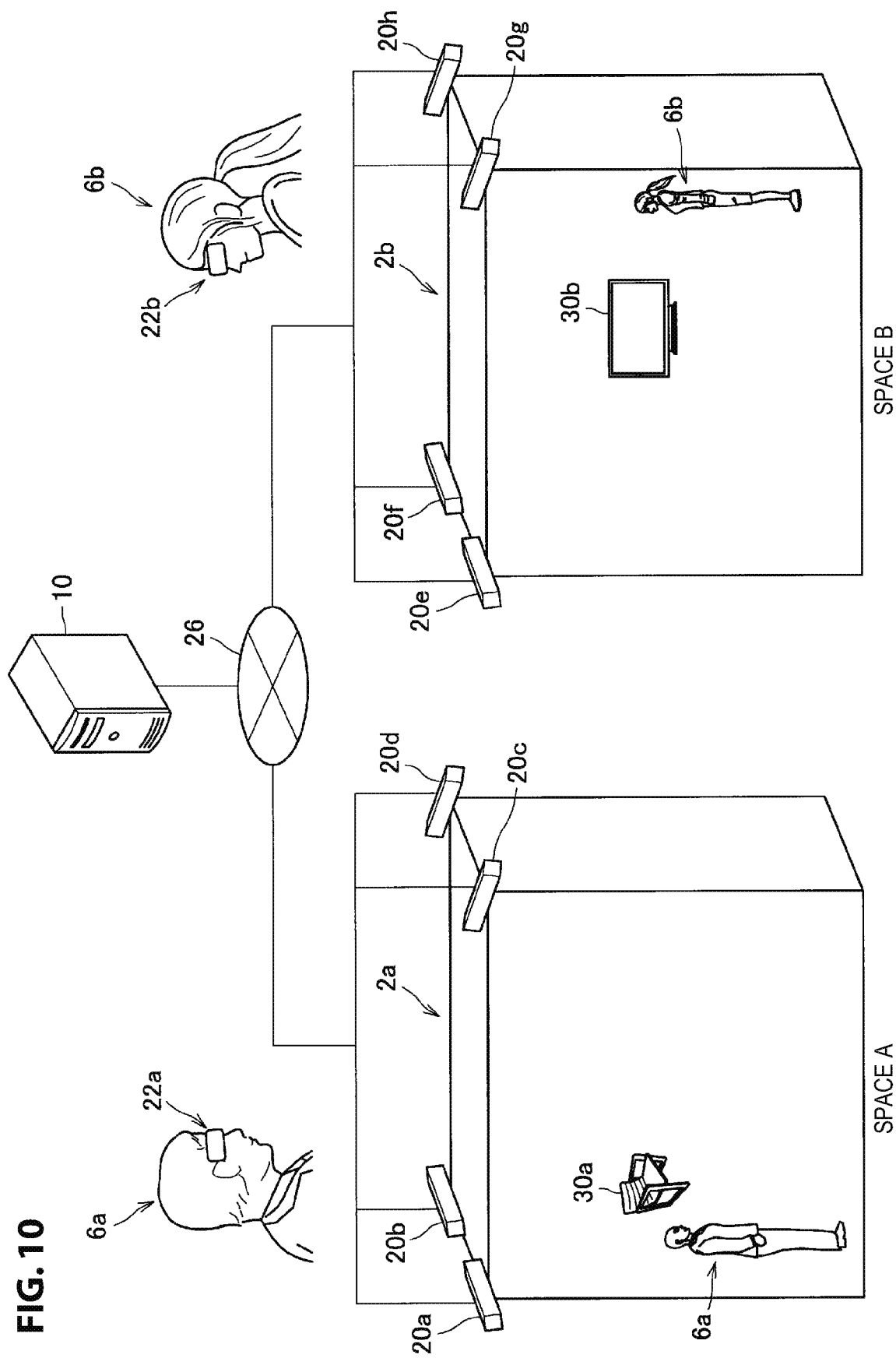
FIG. 10 is an explanatory diagram illustrating a configuration example of an information processing system according to a second embodiment.

The first embodiment has been described above. Next, a second embodiment will be described. FIG. 10 is an explanatory diagram illustrating a configuration example of an information processing system according to the second embodiment. As illustrated in FIG. 10, in the second embodiment, a situation in which a plurality of sensor units 20 is arranged in each of a plurality of rooms 2, and the user 6 is located in each of a plurality of rooms 2 is assumed. Here, a user 6a in a room 2a can be, for example, a user having a management authority for the room 2a, and a user 6b in a room 2b can be a user having a management authority for a room 2b.

Figure 11:
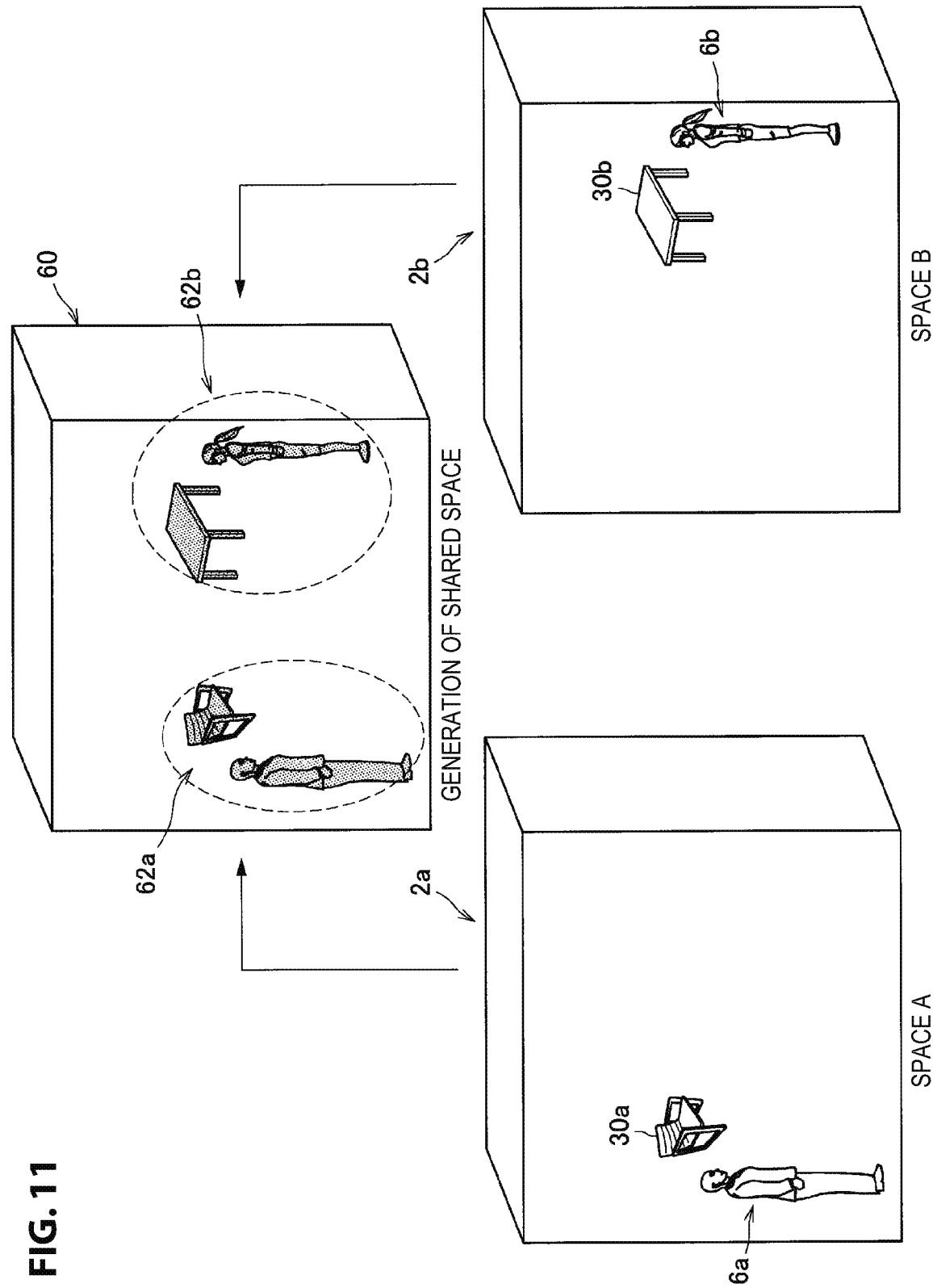
FIG. 11 is an explanatory diagram illustrating a generation example of a virtual shared space 60 according to the second embodiment.
Figure 12:
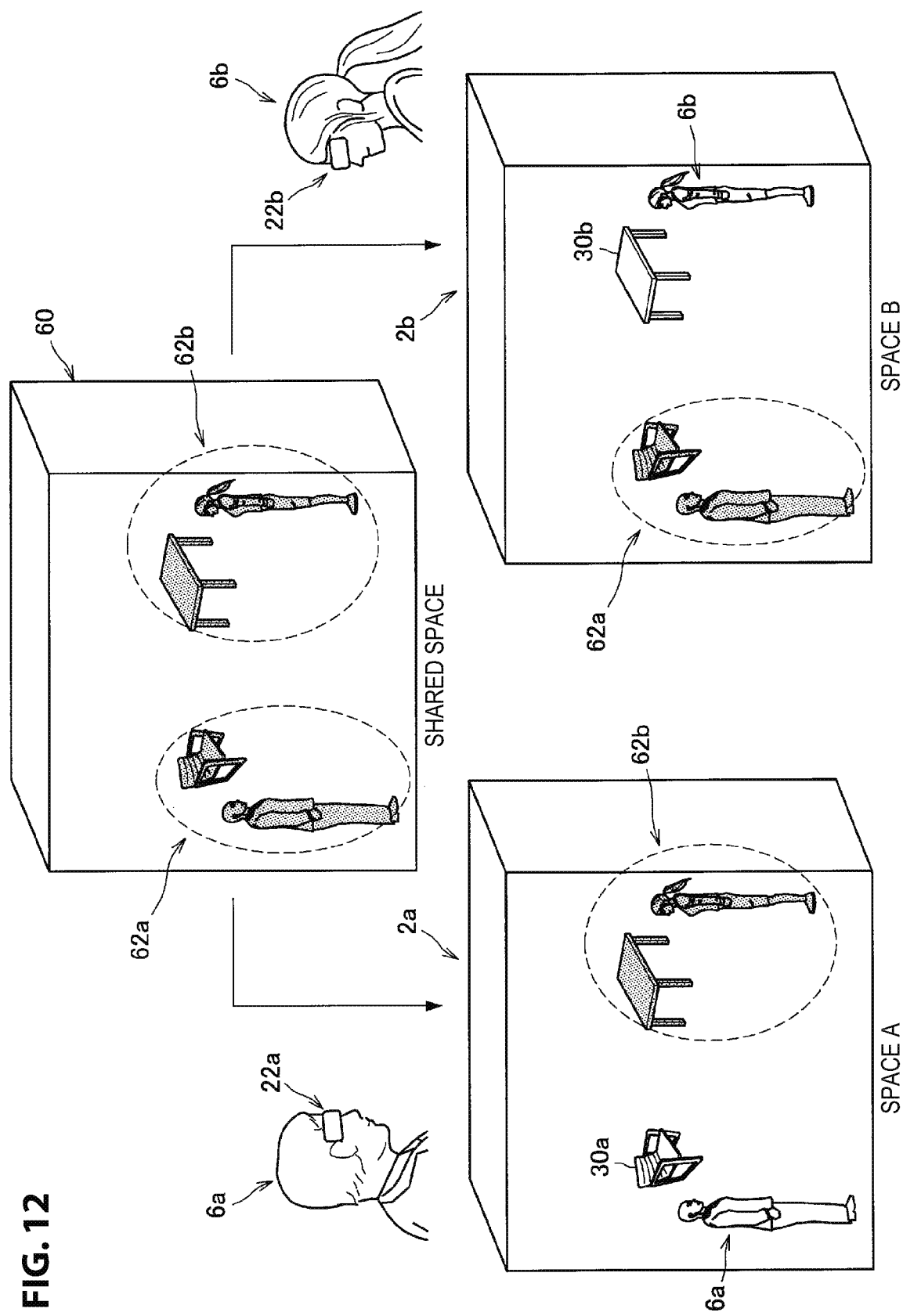
FIG. 12 is a diagram illustrating an example in which content generated on the basis of a shared space 60 is provided to a first display unit 22 in each room 2.

As illustrated in FIG. 11, the server 10 according to the second embodiment can generate a virtual shared space 60 by synthesizing three-dimensional information 62a of the substantially whole of the room 2a acquired by a plurality of sensor units 20 arranged in the room 2a with three-dimensional information 62b of the substantially whole of the room 2b acquired by a plurality of arranged sensor units 20 arranged in the room 2b. Furthermore, on the basis of the generated shared space 60, the server 10 can generate content of a free viewpoint related to the shared space 60 and then transmit the content to a first display unit 22a seen by the user 6a and a first display unit 22b seen by the user 6b as illustrated in FIG. 12. Accordingly, the users 6 located in each of a plurality of room 2 can experience as if the user were located in the shared space 60 by viewing the transmitted content.

As will be described later, the server 10 according to the second embodiment can restrict the viewing of the content of the free viewpoint related to the generated shared space in accordance with the room 2 in which the user 6 is located for each user 6 viewing the content. For example, the server 10 can restrict the user 6a in the room 2a from viewing some objects in the room 2b arranged in the shared space 60 and restrict the user 6b in the room 2b from viewing some objects in the room 2a arranged in the shared space 60.

2-2. Configuration

Next, a configuration according to the second embodiment will be described in detail. Components included in the server 10 according to the second embodiment are similar to those in the first embodiment. The following description will proceed focusing on components having functions different from those of the first embodiment.

2-2-1. Content Generating Unit 104

The content generating unit 104 according to the second embodiment generates the virtual shared space by synthesizing the three-dimensional information of the substantially whole of the room 2a acquired by a plurality of sensor units 20 arranged in the room 2a with the three-dimensional information of the substantially whole of the room 2b acquired by a plurality of arranged sensor units 20 arranged in the room 2b.

Further, the content generating unit 104 generates the content of the free viewpoint related to the shared space on the basis of the generated shared space. Further, the content generating unit 104 may generate the content of the free viewpoint related to the shared space for each user 6 on the basis of whether or not the first display unit 22 seen by the user 6 is a non-transmissive eyeglasses type device. For example, in a case in which the first display unit 22a seen by the user 6a in the room 2a is not a non-transmissive eyeglasses type device (for example, in a case in which the first display unit 22a is a 3D projector, a transmissive eyeglasses type device, or the like), the content generating unit 104 may generate the content of the free viewpoint including only a video 52b of an object located in the other room 2b for the user 6a on the basis of the generated shared space.

2-2-2. Viewing Restricting Unit 108

The viewing restricting unit 108 according to the second embodiment restricts the viewing of the content generated by the content generating unit 104 in accordance with the room 2 in which the user 6 viewing the content is located. For example, the viewing restricting unit 108 restricts the user 6a located in the room 2a from viewing the part of the content corresponding to the object set as the restriction target object among the objects in the room 2b. Further, specific restriction content is substantially similar to that of the first embodiment. Further, a method of setting the restriction target object (and the restriction target space) in each room 2 is also substantially similar to that of the first embodiment.

2-2-3. Display Control Unit 110

The display control unit 110 according to the second embodiment causes the first display unit 22 seen by the user 6 to display the content of the free viewpoint whose viewing is restricted for the user 6.

2-3. Effects

As described above, according to the second embodiment, the server 10 generates the shared space on the basis of the sensing result of the room 2a and the sensing result of the room 2b, and restricts the viewing of the content of the free viewpoint related to the shared space for each user 6 viewing the content in accordance with the room 2 in which the user 6 is located. For example, when the user 6a located in the room 2a designates an object which is not desired to be seen by the user 6b located in the other the room 2b among the objects located in the room 2a as the restriction target object in advance, it is possible to restrict the user 6b from viewing the part of the content of the free viewpoint corresponding to the object.

Further, according to the second embodiment, each user can experience as if each user were located in the same room (shared space) as the other user while staying in separate rooms. For example, each user can do and enjoy activities in the shared space with the user in the other room 2 while protecting their privacy appropriately. As an example, each user can communicate with the user in the other the room 2 using the object actually present in the room of the user.

3. HARDWARE CONFIGURATION

Next, a hardware configuration of the server 10 common in each of the present embodiments will be described with reference to FIG. 13. As illustrated in FIG. 13, the server 10 include a CPU 150, a read only memory (ROM) 152, a RAM 154, a bus 156, an interface 158, a storage device 160 and a communication device 162.

The CPU 150, which functions as an arithmetic processing unit and a control device, controls the whole operation within the server 10 in accordance with various kinds of programs. Further, the CPU 150 implements a function of the control unit 100 at the server 10. Note that the CPU 150 includes a processor such as a microprocessor.

The ROM 152 stores programs, control data such as an operation parameter, or the like, to be used by the CPU 150.

The RAM 154 temporarily stores, for example, programs to be executed by the CPU 150.

The bus 156 includes a CPU bus, or the like. The bus 156 interconnects the CPU 150, the ROM 152 and the RAM 154.

The interface 158 connects the storage device 160 and the communication device 162 to the internal bus 156.

The storage device 160 is a device for data storage, which functions as the storage unit 122. The storage device 160 includes, for example, a storage medium, a recording device which records data in the storage medium, a readout device which reads out data from the storage medium, a deletion device which deletes data recorded in the storage medium, or the like.

The communication device 162 is a communication interface including a communication device, or the like, for connecting to, for example, the communication network 26, or the like. Further, the communication device 162 may be a communication device supporting a wireless LAN, a communication device supporting long term evolution (LTE) or a wired communication device which performs communication in a wired manner. The communication device 162 functions as the communication unit 120.

4. MODIFIED EXAMPLES

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the configuration of the information processing system according to each of the above-described embodiments is not limited to the examples illustrated in FIG. 1 or FIG. 10. For example, although only one server 10 is illustrated in FIGS. 1 and 10, the present disclosure is not limited to this example, and the function of the server 10 according to each of the above-described embodiments can be realized by a plurality of computers operating cooperatively.

Further, in each of the above-described embodiments, the example in which the information processing device of the present disclosure is the server 10 has been described, but the present disclosure is not limited thereto. For example, the information processing device may be a general-purpose PC, a tablet terminal, a game machine, a mobile phone such as a smartphone, a portable music player, a robot, a projector, or a wearable device such as, for example, an HMD or AR glasses.

Further, the steps of the flow of the process according to each of the above-described embodiments do not necessarily have to be executed in the described order. For example, the order in which the steps are executed may be changed as appropriate. Further, the steps may be partially executed in parallel or individually instead of being executed in chronological order. Further, some of steps described may be omitted, or other steps may be added.

Further, in accordance with each of the above-described embodiments, it is also possible to provide a computer program causing hardware such as the CPU 150, the ROM 152, and the RAM 154 to execute the same functions as those of the components of the server 10 according to each of the above-described embodiments. Further, a recording medium having the computer program recorded therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device, including:
a viewing restricting unit configured to restrict, on the basis of a predetermined condition, viewing of a part of content corresponding to a partial space of a real space among content of a free viewpoint generated based on a sensing result for the real space.

(2)
The information processing device according to (1), in which the viewing restricting unit restricts movement of a viewpoint in the part of content.

(3)
The information processing device according to (1), in which the viewing restricting unit controls display of the part of content such that visibility of the part of content is lowered.

(4)
The information processing device according to (3), in which the viewing restricting unit performs a process of changing a display color of the part of content to a predetermined color, a process of increasing transparency of the part of content, or a process of blurring the part of content.

(5)
The information processing device according to any one of (1) to (4), in which the partial space of the real space are spaces satisfying the predetermined condition in the real space.

(6)
The information processing device according to (5), in which the spaces satisfying the predetermined condition are spaces including a restriction target object and/or a restriction target space.

(7)
The information processing device according to (6), in which the viewing restricting unit does not permit movement of a viewpoint to an inside of the part of content.

(8)
The information processing device according to (6) or (7), in which the restriction target object and/or the restriction target space are set on the basis of an input of a user on a manipulation screen indicating a layout of the real space.

(9)
The information processing device according to any one of (6) to (8), in which the restriction target object and/or the restriction target space are set on the basis of detection of a pointing motion of a user in the real space.

(10)
The information processing device according to any one of (6) to (9), in which the restriction target space is set on the basis of a detection result for a region to which a user moves in the real space.

(11)
The information processing device according to any one of (6) to (10), in which the restriction target space is set on the basis of a detection result of positions of a plurality of predetermined objects arranged in the real space.

(12)
The information processing device according to (5), in which the spaces satisfying the predetermined condition are spaces including an object matching a predetermined attribute and/or spaces matching a predetermined attribute.

(13)
The information processing device according to (12), in which the spaces matching the predetermined attribute include a space in which an average stay time of a user is smaller than a predetermined threshold value and/or a space in which a visiting frequency of the user is smaller than a predetermined threshold value.

(14)
The information processing device according to any one of (1) to (4), in which the viewing restricting unit restricts the viewing of the part of content in a case in which the predetermined condition is satisfied.

(15)
The information processing device according to (14), in which the predetermined condition includes a condition related to a relationship between a first user associated with the real space and a second user viewing the content.

(16)
The information processing device according to (14) or (15), in which the predetermined condition includes a condition related to an accounting state of a user viewing the content or a condition related to a registration state of a paying member.

(17)
The information processing device according to any one of (1) to (16), in which the content is viewed by a user located outside the real space, and
the information processing device further includes a display control unit configured to cause a display unit located in the real space to display information indicating an object in the partial space of the real space and/or the partial space of the real space.

(18)
The information processing device according to any one of (1) to (17), further including:
an acquiring unit configured to acquire the sensing result; and
a content generating unit configured to generate the content of the free viewpoint on the basis of the sensing result.

(19)
An information processing method, including:
restricting, by a processor, on the basis of a predetermined condition, viewing of a part of content corresponding to a partial space of a real space among content of a free viewpoint generated based on a sensing result for the real space.

(20)
A program causing a computer to function as:
a viewing restricting unit configured to restrict, on the basis of a predetermined condition, viewing of a part of content corresponding to a partial space of a real space among content of a free viewpoint generated based on a sensing result for the real space.

REFERENCE SIGNS LIST 10 server
20 sensor unit
22 first display unit
24 second display unit
26 communication network
100 control unit
102 detection result acquiring unit
104 content generating unit
106 restriction target setting unit
108 viewing restricting unit
110 display control unit
112 monitoring state determining unit
120 communication unit
122 storage unit

The invention claimed is:

1. An information processing device, comprising:
a processor configured to:
receive images of a real space captured from a plurality of viewpoints as virtual content, wherein
the images are captured based on sensor data, and
each viewpoint of the plurality of viewpoints is movable to view different parts of the virtual content;
receive a range of the virtual content based on a first user input, wherein
the range of the virtual content corresponds to a partial space of the real space, and
the partial space includes at least one of a restriction target object or a restriction target space;
set at least one of the restriction target object or the restriction target space based on a second user input on a manipulation screen indicating a layout of the real space;
restrict display of a part of the virtual content based on the received range of the virtual content and a condition, wherein
the partial space in the real space satisfies the condition,
the restriction of the display comprises an increase in transparency of the part of the virtual content, and
the part of the virtual content corresponds to the partial space of the real space; and
control display of the virtual content based on the restriction.

2. The information processing device according to claim 1, wherein the processor is further configured to restrict movement of at least one viewpoint among the plurality of viewpoints in the part of the virtual content.

3. The information processing device according to claim 1, wherein the processor is further configured to control the display of the part of the virtual content such that visibility of the part of the virtual content is lowered.

4. The information processing device according to claim 3, wherein the processor is further configured to change a display color of the part of the virtual content to a specific color.

5. The information processing device according to claim 1, wherein the processor is further configured to restrict movement of at least one viewpoint among the plurality of viewpoints to an inside of the part of the virtual content.

6. The information processing device according to claim 1, wherein the processor is further configured to set the at least one of the restriction target object or the restriction target space based on detection of a pointing motion of a user in the real space.

7. The information processing device according to claim 1, wherein the processor is further configured to set the restriction target space based on detection of a user movement to a region in the real space.

8. The information processing device according to claim 1, wherein the processor is further configured to set the restriction target space based on detection of positions of a plurality of objects in the real space.

9. The information processing device according to claim 1, wherein the partial space includes one of an object that matches an attribute or a first space that matches the attribute.

10. The information processing device according to claim 9, wherein the partial space further includes at least one of:
a second space, wherein an average stay time of a user is smaller than a first threshold value in the second space, or
a third space, wherein a visiting frequency of the user is smaller than a second threshold value in the third space.

11. The information processing device according to claim 1, wherein the processor is further configured to restrict the display of the part of the virtual content in a case the condition is satisfied.

12. The information processing device according to claim 11, wherein the condition includes a relationship between a first user associated with the real space and a second user viewing the virtual content.

13. The information processing device according to claim 11, wherein the condition includes at least one of an accounting state of a user viewing the virtual content or a specific condition related to a registration state of a paying member.

14. The information processing device according to claim 1, wherein
the virtual content is viewable by a user outside the real space, and
the processor is further configured to cause a display screen located in the real space to display information indicating one of an object in the partial space of the real space or the partial space of the real space.

15. The information processing device according to claim 1, wherein the processor is further configured to:
acquire the sensor data; and
generate the virtual content from the plurality of viewpoints based on the sensor data.

16. An information processing method, comprising:
receiving, by a processor, images of a real space captured from a plurality of viewpoints as virtual content, wherein
the images are captured based on sensor data, and
each viewpoint of the plurality of viewpoints is movable to view different parts of the virtual content;
receiving a range of the virtual content based on a first user input, wherein
the range of the virtual content corresponds to a partial space of the real space, and
the partial space includes at least one of a restriction target object or a restriction target space;
setting, by the processor, at least one of the restriction target object or the restriction target space based on a second user input on a manipulation screen indicating a layout of the real space;
restricting, by the processor, display of a part of the virtual content based on the received range of the virtual content and a condition, wherein
the partial space in the real space satisfies the condition,
the restriction of the display comprises an increase in transparency of the part of the virtual content, and
the part of the virtual content corresponds to the partial space of the real space; and
controlling, by the processor, display of the virtual content based on the restriction.

17. A non-transitory computer-readable medium having stored thereon, computer-executable instructions which, when executed by a computer, cause the computer to execute operations, the operations comprising:
receiving images of a real space captured from a plurality of viewpoints as virtual content, wherein
the images are captured based on sensor data, and
each viewpoint of the plurality of viewpoints is movable to view different parts of the virtual content;

receiving a range of the virtual content based on a first user input, wherein
  the range of the virtual content corresponds to a partial space of the real space, and
  the partial space includes at least one of a restriction target object or a restriction target space;
setting at least one of the restriction target object or the restriction target space based on a second user input on a manipulation screen indicating a layout of the real space;
restricting display of a part of the virtual content based on the received range of the virtual content and a condition, wherein
  the partial space in the real space satisfies the condition,
  the restriction of the display comprises an increase in transparency of the part of the virtual content, and
  the part of the virtual content corresponds to the partial space of the real space; and
controlling display of the virtual content based on the restriction.

* * * * *